UNITED STATES PATENT OFFICE.

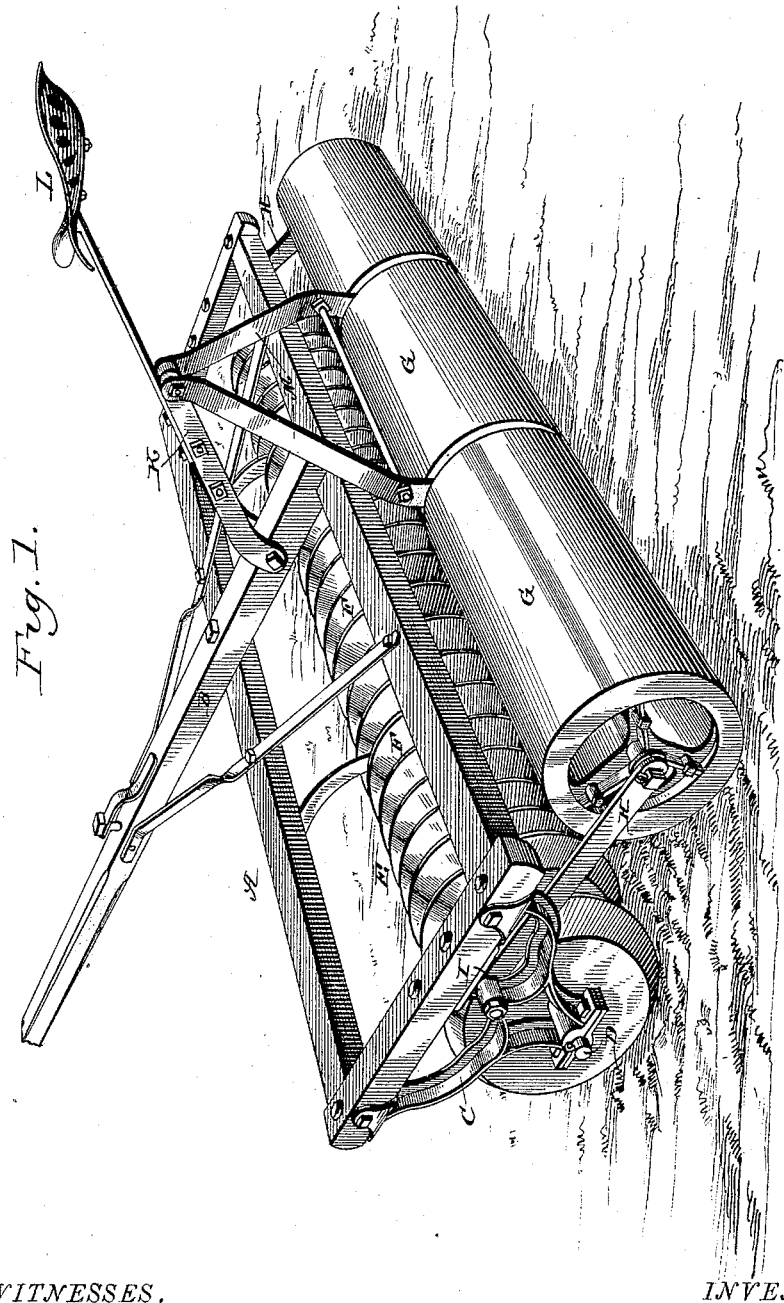

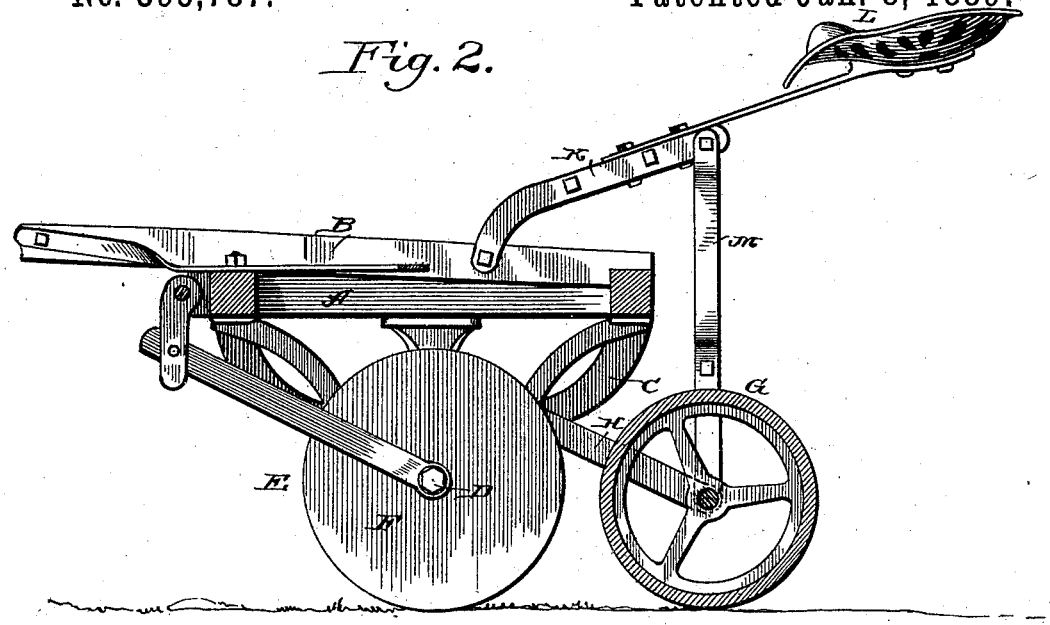
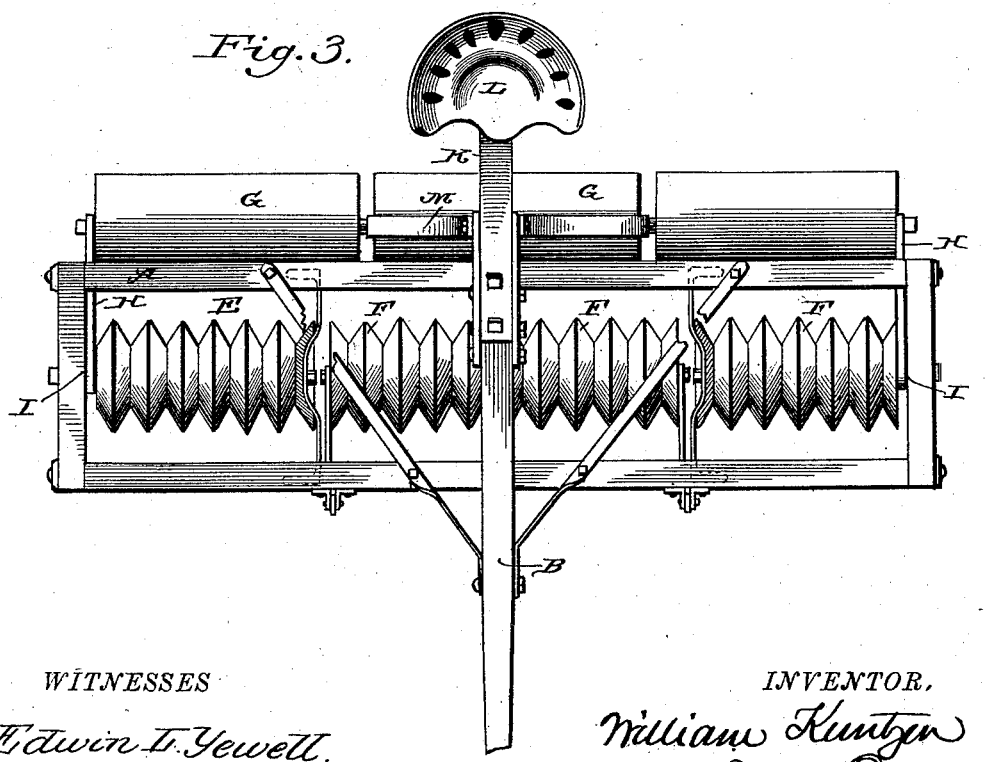

WILLIAM KNUTZEN, OF DONAHUE, IOWA.

COMBINED CLOD-CRUSHER AND ROLLER.

SPECIFICATION forming part of Letters Patent No. 395,787, dated January 8, 1889.

Application filed December 22, 1887. Serial No. 258,736. (No model.)

*To all whom it may concern:*

Be it known that I, WILLIAM KNUTZEN, of Donahue, in the county of Scott and State of Iowa, have invented certain Improvements in a Combined Clod-Crusher and Roller, of which the following is a specification.

My invention relates to a machine intended more particularly for rolling seed-land after it has been planted, and also immediately after the grain appears above the surface; and to this end it consists, essentially, in the combination of a suitable draft-frame with a forward roller having a series of V-shaped circumferential grooves and a rear roller having a smooth surface. The machine is intended more particularly for use in those sections where the soil is light and where it is necessary, immediately after the seed is planted and harrowed in, to go over the ground with a roller, in order to compact the soil around the seed, for the double purpose of preventing the seed from being blown away and of bringing the soil in intimate contact with the seed, which is thereby caused to sprout more speedily and with greater certainty.

In order to secure the best results, it is desirable to crush the clods, to compact the soil, and to produce a practically-uniform surface. When my machine is employed, the grooved roller effectually crushes the clods, instead of driving them down into the ground. It leaves the surface in small ridges, which are flattened down and nearly obliterated by the smooth roller which travels in the rear. The slight grooves or depressions, if any, which remain after the passage of the smooth roller, will serve as drains to keep the water from washing the surface of the ground. After the grain has sprouted it is desirable, in certain conditions of the soil, to compact the same around the roots of the plant. This operation is also effectually performed by my machine.

I do not claim either a smooth roller or a roller with V grooves, separately considered. Neither do I claim the combination of a spiked or a toothed roll with a smooth roll traveling thereafter. For the purposes which I have in view I find that the combination of the roll provided with V grooves, and the smooth roll in its rear, give the best results, and it is to this combination that my invention is limited.

In the accompanying drawings, Figure 1 is a perspective view of the device. Fig. 2 is a vertical section through the same, from front to rear, on the line $x\ x$. Fig. 3 is a plan view of the same.

Referring to the drawings, A represents the frame, usually of a rectangular form and having a pole, B, firmly secured thereto. At each end of the frame, and attached to the under side thereof, are castings C, forming bearings for the shaft D of a crushing-roller, E. This crushing-roller is preferably made of a series of sections, F, each having a V-shaped periphery and a square or polygonal eye through which the shaft D, which is correspondingly formed, passes, and which is rounded at the ends, so that it may turn freely in its bearings in the castings C.

To make the crushing-roller yielding or flexible, so that it will accommodate itself to inequalities in the ground, I may construct it of several sections and connect them in any suitable manner to the frame. As shown in Fig. 3, the crushing-roller is formed of three parts, the end sections being journaled in the castings C at the outer ends, and bearings C' at the inner ends, and the central sections being held to the frame by straps D'.

At the rear of the crushing-roller is a smoothing-roller, G, which may be formed of one or more sections, (three being shown in the drawings,) and is connected to the frame at each end, and, if preferred, at intermediate points by straps H, which are pivoted to the castings C, as shown at I.

To the pole, at any suitable point, is pivoted a support, K, on which a seat, L, is secured, the upper end of the support being sustained in an elevated position by a standard, M, pivoted to the journals of one of the sections of the smoothing-roller G.

The crushing-roller, being formed of a series of sections with V-shaped peripheries, will act on the ground to form it into a series of ridges of triangular section, while the smoothing-roller acting on these ridges will level them, and this action of the two rollers effectually crushes and pulverizes the clods. The smoothing-roller, being pivoted to the frame, will accommodate itself to any inequality in the surface of the ground, and the seat, having pivotal connection with the frame and also with the roller, will permit the driver's weight to act directly on the roller, while at the same time accommodating itself to the rising and falling of the said roller.

It is to be understood that while I describe a crushing-roller made of a series of sections, F, each having a V-shaped periphery, it is equally practicable to make the crushing-roller of a series of staves with their outer surface similar to the crushing-roller shown.

Having thus described my invention, what I claim is—

The combination of a draft-frame, the front crushing-roller having a series of circumferential V-grooves, and the smooth cylindrical roller arranged to travel directly in rear of the first-named roller, as described and shown, whereby the clods are first pulverized and the surface of the soil formed into ridges, and these ridges subsequently rolled down, as and for the purpose described.

In testimony whereof I hereunto set my hand this 9th day of November, 1887, in the presence of two attesting witnesses.

WILLIAM KNUTZEN.

Witnesses:
E. P. LYNCH,
WM. P. BETTENDORF.